US008653837B2

(12) United States Patent
Frangen

(10) Patent No.: US 8,653,837 B2
(45) Date of Patent: Feb. 18, 2014

(54) SENSOR SYSTEM FOR MONITORING SURROUNDINGS ON A MECHANICAL COMPONENT AND A METHOD FOR ACTIVATING AND EVALUATING THE SENSOR SYSTEM

(75) Inventor: Joachim Frangen, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 475 days.

(21) Appl. No.: 12/871,648

(22) Filed: Aug. 30, 2010

(65) Prior Publication Data

US 2011/0050256 A1 Mar. 3, 2011

(30) Foreign Application Priority Data

Aug. 31, 2009 (DE) .................. 10 2009 029 021

(51) Int. Cl.
*G01R 27/26* (2006.01)
*G06F 3/041* (2006.01)
*G06F 3/045* (2006.01)

(52) U.S. Cl.
USPC ........... 324/681; 324/662; 324/686; 324/674; 345/173; 345/174

(58) Field of Classification Search
USPC ........................................................ 324/658
See application file for complete search history.

(56) References Cited

U.S. PATENT DOCUMENTS

| 5,399,979 | A * | 3/1995 | Henderson et al. | 324/677 |
| 6,448,789 | B1 * | 9/2002 | Kraetzl | 324/658 |
| 6,492,979 | B1 * | 12/2002 | Kent et al. | 345/173 |
| 6,501,284 | B1 * | 12/2002 | Gozzini | 324/681 |
| 6,700,393 | B2 * | 3/2004 | Haag et al. | 324/674 |
| 6,784,673 | B2 * | 8/2004 | Tomasi et al. | 324/664 |
| 6,819,316 | B2 * | 11/2004 | Schulz et al. | 345/174 |
| 7,119,554 | B2 * | 10/2006 | Nakamura et al. | 324/681 |
| 7,138,809 | B2 * | 11/2006 | Nakamura et al. | 324/681 |
| 7,230,435 | B2 * | 6/2007 | Kunikiyo et al. | 324/658 |
| 7,855,566 | B2 * | 12/2010 | Richter | 324/687 |
| 7,956,794 | B2 * | 6/2011 | Skultety-Betz et al. | 342/22 |
| 2002/0101252 | A1 * | 8/2002 | Cheng et al. | 324/681 |

FOREIGN PATENT DOCUMENTS

DE 202005002475 * 6/2006 ............... B25J 19/06

OTHER PUBLICATIONS

Hyung-Kew Lee, Sun-Il Chang, and Euisik Yoon, A capacitive sensor in dual implementation with tactile imaging capability on a single flexible platform for robot assistant applications, IEEE, 2006 MEMS 2006, Istanbul, Turkey, pp. 22-26.*
Hyung-Kew Lee, Sun-Il Chang, and Euisik Yoon, A capacitive proximity sensor in dual implementation with tactile imaging capability on a single flexible platform for robot assistant applications, IEEE, 2006 MEMS 2006, Istanbul, Turkey, pp. 22-26.*

(Continued)

*Primary Examiner* — Jermele M Hollington
*Assistant Examiner* — Christopher McAndrew
(74) *Attorney, Agent, or Firm* — Kenyon & Kenyon LLP

(57) ABSTRACT

A sensor system and an evaluation method for monitoring surroundings on a mechanical component, having at least one capacitive sensor element that is attachable on the surface of machines or machine parts, in which at least one sensor element is made up of a layered structure of flexible, electrically conductive and electrically insulating layers, electrically conductive surfaces of one layer being positioned with lateral spacing above insulating layers lying between them in such a way that electrical field lines form between the conductive surfaces, which change measurably upon approach to and/or contact with a body or object.

19 Claims, 7 Drawing Sheets

(56) References Cited

OTHER PUBLICATIONS

Hyung-Kew Lee, Sun-II Chang, and Euisik Yoon, Dual-mode capacitive proximity sensor for robot application: Implamentation of tactile and proximity sensing capability on a single polymer platform using shared electrodes., Dec. 2009, IEEE Sensors Journal, vol. 9, No. 12. pp. 1748-1755.*

* cited by examiner

Fig. 3A  Fig. 3B  Fig. 3C
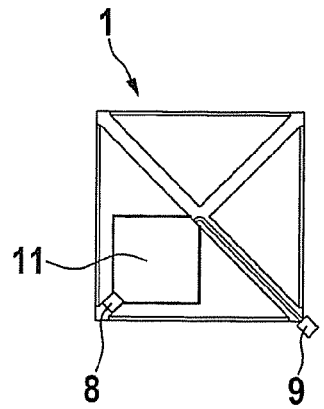 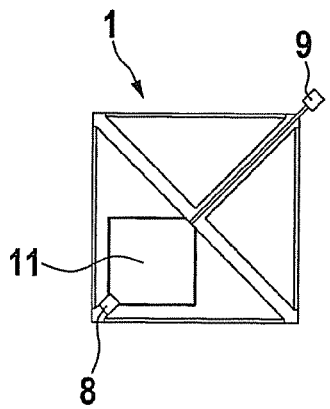 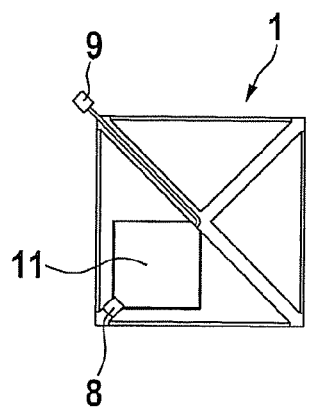
Fig. 4
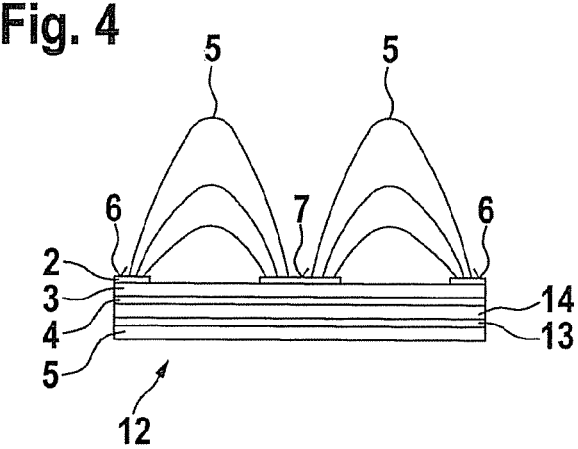
Fig. 5A  Fig. 5B  Fig. 5C
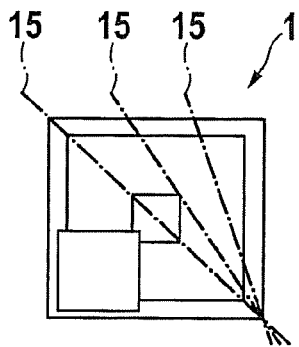 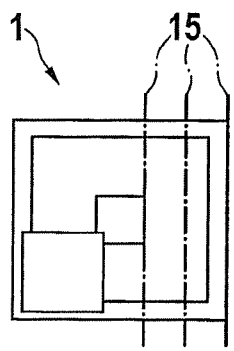 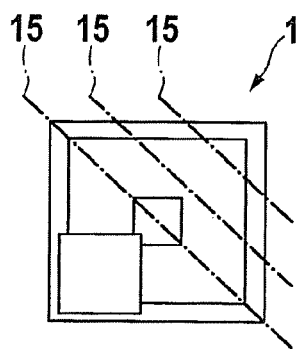

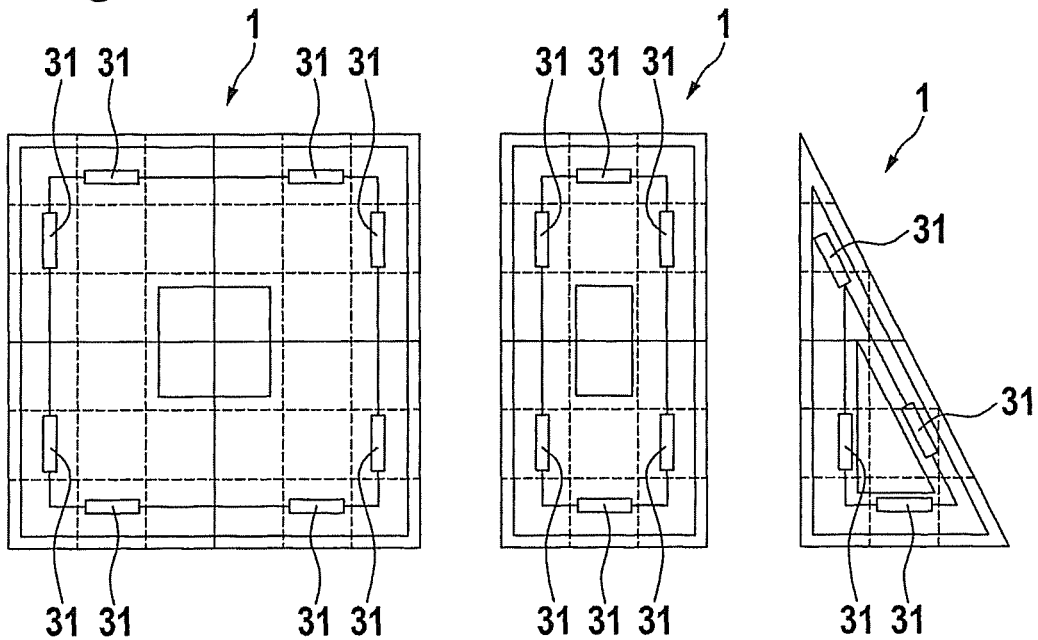
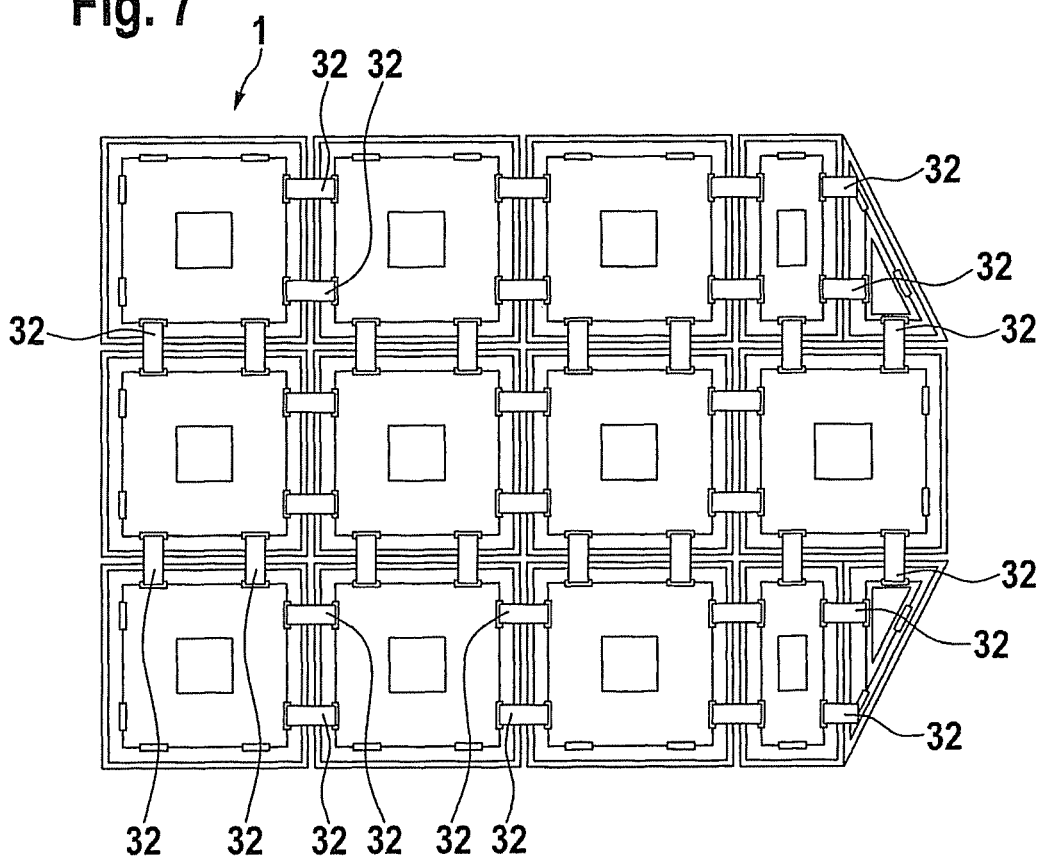

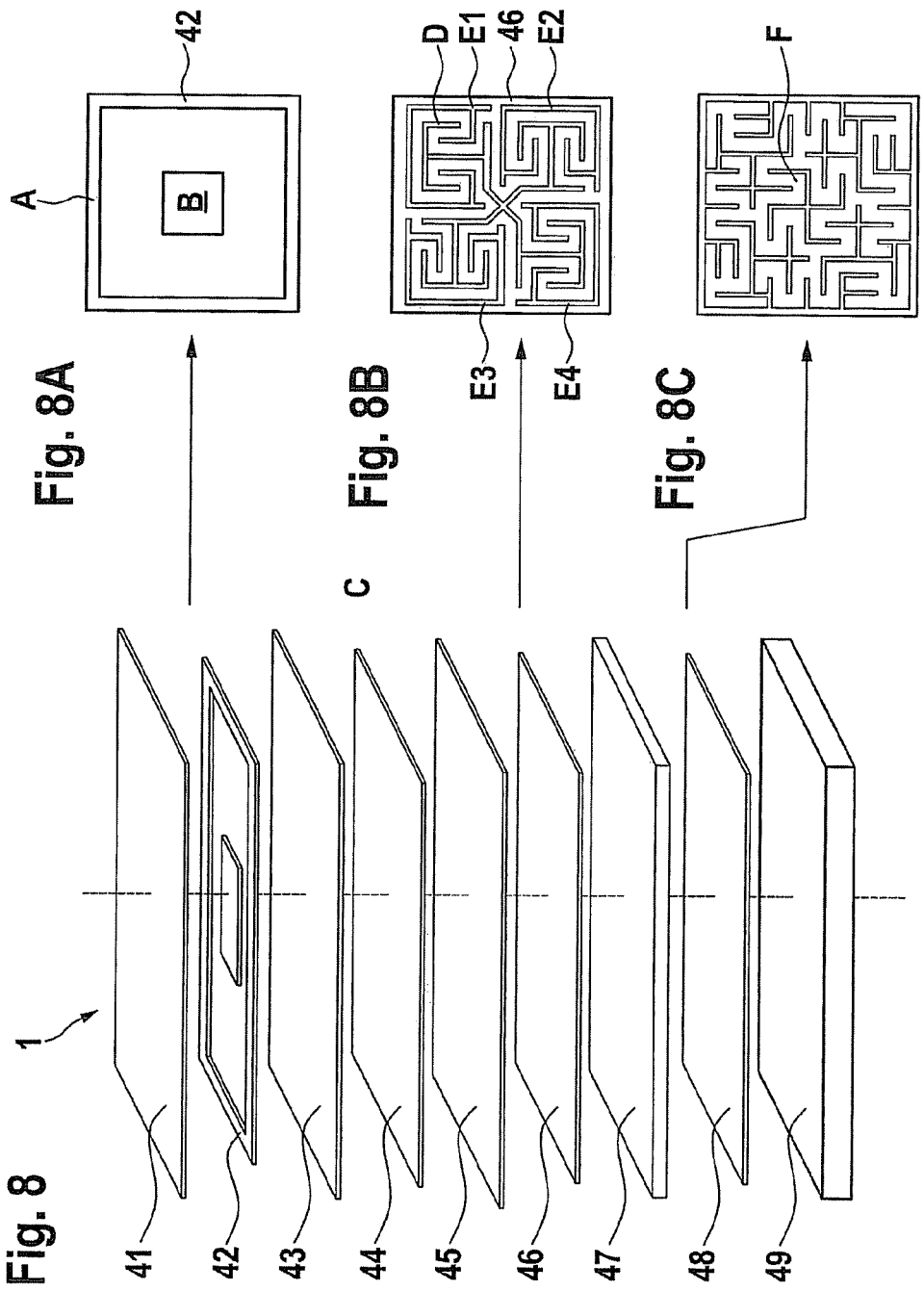

SENSOR SYSTEM FOR MONITORING SURROUNDINGS ON A MECHANICAL COMPONENT AND A METHOD FOR ACTIVATING AND EVALUATING THE SENSOR SYSTEM

CROSS REFERENCE

The present application claims the benefit under 35 U.S.C. §119 of German Patent Application No. 102009029021.4 filed on Aug. 31, 2009, which is expressly incorporated herein by reference in its entirety.

FIELD OF THE INVENTION

The present invention relates to a sensor system for monitoring surroundings, in particular also for detecting collisions on a mechanical component, and a method for activating and evaluating the sensor system, in particular for monitoring approaches to a machine or to machine parts of automatic production or assembly machines.

BACKGROUND INFORMATION

With such automatic production or assembly machines, an encounter of humans such as operators or service personnel for the automatic production or assembly machines with moving machines or machine parts may result in collisions that endanger the human and/or the functioning of the machine. When such an approach is detected early, or even in the event of contact, measures may be taken to prevent a collision, or at least to reduce the energy of the collision. This is often an important prerequisite for permitting the simultaneous presence of human and machine in the same work space.

For automatic approach and collision detection, monitoring of the surroundings of the machine may be conducted using various sensor principles and sensors, such as, for example, optical sensors, ultrasound sensors or capacitive sensors, or also using contact detection via the piezoelectric effect. Such sensors may normally be used in special cases, for example to monitor simply shaped machine parts having defined motion paths, so that, for example, when the approach of a human is detected, reliable deceleration of the drives or of the processing units of the machines may be triggered.

On the other hand, with relatively complexly shaped surfaces or a complex path motion of the dangerous machine part, consistent monitoring of the surroundings with the aid of sensors is often possible only using very great effort, or perhaps not even at all. For example, optical detection may be impeded at edges and undercuts of the machine surface by shading, or integration of sensors may fail due to lack of installation space.

For operator-safe machines it is customary, to fulfill safety standards, to employ safety devices having two mutually independent safety channels provided with diagnostic function, so that an individual error in the system does not result in loss of safety. The failure of one safety channel is reliably detected and reported, while the second safety channel maintains the safety function. Such applications require duplicate and independently executed monitoring by sensors. Sensors for reliable design of machines having two safety channels, which are flexibly adaptable to complexly shaped surfaces, are not known.

One potentially possible approach to collision prevention is to employ a protective fence in machines such as automatic assembly machines, so that the safety of the operator is ensured by forced separation of the human from the machine. In this case there may then be safe sluice gates present in the protective fence, for example for transferring parts. It is no longer possible to work directly together on an automatic production or assembly machine using such a protective fence, however, since the human and the machine cannot use the same work space at the same time here.

Another approach having a similar effect is known as two-handed operation, which only works when each hand of the operator is operating a pushbutton. In this case the pushbuttons are situated far enough outside the work space that any danger to the operator from the running machine is largely eliminated. In this approach, the human and the machine may use the same work space in principle, but not simultaneously. For example, the human and the machine cannot perform joint operating procedures.

German Patent Application No. DE 20 2005 002 475 U1 describes a foam covering which is equipped with proximity-detecting tactile and capacitive sensors, specifically for the application of collision detection in industrial robots. Mounting such a structure on different industrial robots is often complicated and expensive, however.

SUMMARY

The present invention relates to a sensor system for monitoring surroundings on a mechanical component, having at least one capacitive sensor element which is mountable on the surface of machines or machine parts. According to the present invention, the at least one sensor element is built up in an advantageous manner using a layered structure of flexible electrically conductive and electrically insulating layers, electrically conductive surfaces of one layer being spaced laterally over insulating layers positioned between them in such a way that electrical field lines form between the conductive surfaces, which change measurably upon approach and/or contact with a body that changes the field, such as a person.

Additional layers form electrical field lines in an electrically compressible layer, so that a force acting perpendicularly to the surface of the sensor element brings about a measurable change in capacitance due to the compression of the layer.

An object of the present invention to make possible operator-safe cooperation of humans and moving machine parts in the same work space at the same time.

An example sensor system according to the present invention, with a modular structure, may be applied to moving machine parts at relatively little expense, so that an approach of humans and/or contact with humans is detected reliably and these events may be reported to electrical signal outputs. Reliable detection means in this case that a malfunction of a sensor element may also be diagnosed promptly without danger to the human. In particular, with the flexible layers according to the present invention, even complexly shaped surfaces on machines may be covered without gaps in a simple manner with this sensor system.

Thus if the sensor system reports an approach or a contact, a higher-level safety controller may trigger effective protective measures; for example, a pause in movement in the event of an approach or a contact, or—if a malfunction of the sensor element is detected by self-diagnosis—there may even be a stoppage of the machine and a service call.

The example sensor system according to the present invention may be constructed in such a way that a central conductive surface having one polarity is present, and at the edge of the sensor elements or on adjacent sensor elements a second conductive surface having the other polarity is present which encloses the central conductive surface via an insulating layer, and the electrical field lines form between them. A stratified structure of the layers may advantageously include the conductive surfaces with the formation of the electrical field lines in the upper layer, the insulating layer positioned below it, a conductive surface positioned below that as a shielding layer, and a layer positioned next below that providing insulation toward the machine.

Alternatively, stratification of the layers may also include the conductive surfaces for forming the electrical field lines in the space on the operator side in the upper layer, the insulating layer positioned below that, a conductive surface positioned below that as a shielding electrode, another insulating layer, a layer having at least one electrode, a compressible and electrically insulating layer, another shielding electrode and another layer positioned next below that providing insulation toward the machine, the capacitance between two or more electrodes being measurably changeable by tactile pressure from outside.

Because of the separate detection of an approach and a contact or a collision, there are also two sensor channels working independently of each other, which give a high degree of reliability when an error occurs, because of their redundancy.

The example sensor system according to the present invention is advantageous in particular when a plurality of sensor elements are connectable to each other through lateral contacts or other connections.

It is possible in a simple manner to attach flexible electric circuit boards to one, more than one, or all sensor elements to receive electronic measuring circuit parts on the machine side, which are contactable or connectable with each other and are switchable to an electronic evaluation unit.

The electrically conductive layers or surfaces may be made of a flexible, conductive mat, preferably copper matting, and the electrically insulating layers of a textile-like mesh, preferably felt, plastic or foam, and the layers may be adapted and applied to complex three-dimensional shapes, preferably through mechanical linking of variously shaped basic elements, or else by cutting to size and bonding.

Using an example method according to the present invention for activating and evaluating the example sensor system described earlier, an electronic evaluation unit may address all sensor elements cyclically and check whether a significant change in capacitance has occurred in at least one sensor element in comparison to a reference value, so that an approach or a collision in the surroundings of the machine or machine part is signaled at one of the outputs.

This may require quick transmission to the evaluation unit of the switching conditions of the approach detection and collision detection of all sensor elements. To address linearly chained sensor elements, the sequence of the sensor elements may be used, by forwarding the data along the chain to the evaluation unit, possibly over a plurality of sensor elements.

To that end, each sensor element may receive one data input and one data output each for the two subsystems: approach detection and collision detection, the outputs of the first sensor element being connected to the electronic evaluation unit and the inputs of each sensor element being connected to the outputs of the subsequent sensor element. All sensor elements receive a common clock signal to forward information, so that the information about the switch states of all sensor elements is transmitted progressively from element to element to the electronic evaluation unit at each clock cycle.

In another, slower cycle each sensor element may then also be subjected to a self-diagnosis; test voltages or a characteristic signal pattern may be applied to the sensor elements in a conventional manner.

In summary, the present invention may yield the following benefits:

Full-surface two-channel monitoring of individually shaped surfaces is possible.

A modular structure of the sensor system having mechanically and electrically sequenceable sensor elements is possible, for example, according to the principle of carpet mats.

A basic set of sensor elements with a few basic geometric shapes (for example, squares, rectangles, triangles) enables flexible assembly of complexly shaped sensor skins for almost any surface.

The sensor elements may be assembled on a textile-like substrate, using arbitrary materials such as mesh, felt, plastic, foam, etc., which adapt flexibly to the surface shape of machines.

Sheets having multi-layered printed conductors are usable, which may be cut to size so that even complex surfaces may be covered gap-free without custom fabrication.

The sensor system may be applied quickly and simply, for example, using glue, or as a composite of a plurality of sensor elements that is held together with adhesive tape and is formed by linking sensor elements from basic elements, which will be explained in further detail on the basis of the description of the exemplary embodiments. Since the sensor skin of multiple sensor elements is quickly removable and mountable, for example, for purposes of service and maintenance, only minimal labor cost results and machine down times are short.

For such service and maintenance purposes there is a high safety standard due to mutually independent, simultaneously operating sensor systems: approach detection (non-contact) and contact force detection (tactile), including self-diagnosis for both systems.

Reliable operation may be guaranteed by reliable self-diagnosis of the sensor system. The self-diagnosis is also available for both simultaneously operating sensor systems: approach detection (non-contact) and contact force detection (tactile).

Both sensor systems (approach detection and contact force detection) are also implementable individually, for example, in order to achieve cost benefits in appropriate applications.

The approach detection responds both to rapid motions at a great distance (dynamic function) and to the static presence of objects in close proximity (static function). This prevents false triggering by static objects at a great distance (such as machine parts in the surrounding area).

The cost of calibrating data is small due to uniform sensor switching thresholds for all sensor elements (static and dynamic function).

BRIEF DESCRIPTION OF THE DRAWINGS

The present invention is described below on the basis of the exemplary embodiments shown in the figures.

FIGS. 3A, 3B and 3C show variants of the arrangement of the connecting elements according to FIG. 2 and of the positioning of a circuit board on each sensor element.

FIG. 4 shows a second exemplary embodiment of a sensor element having an additional electrode for forming a capacitive collision detector.

FIGS. 5A, 5B and 5C show the exemplary embodiment according to FIG. 1, with flexible layers and with cutting lines for conforming to various surfaces.

FIG. 6 shows sensor elements having various geometric shapes.

FIG. 7 shows an example sensor system having a plurality of sensor elements of various geometric shapes, combined into a sensor skin.

FIGS. 8, 8A, 8B, 8C show a layered structure of various layers of a sensor element.

DETAILED DESCRIPTION OF EXAMPLE EMBODIMENTS

Figure 1A:
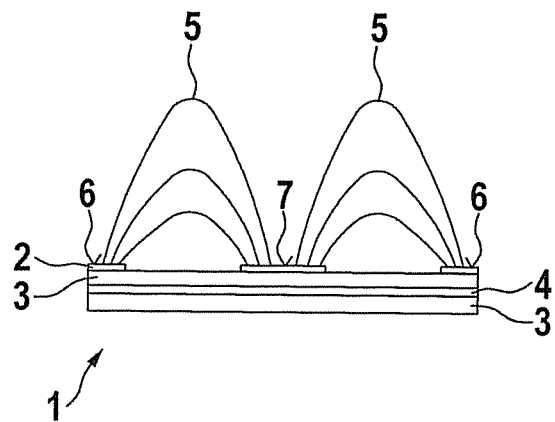
FIGS. 1A and 1B show various views of a first exemplary embodiment of flexible layers for forming a capacitive sensor element.

FIG. 1A shows a schematic view of a capacitive sensor element 1 of layered assembly, which includes a flexible, for example, textile-like electrically conductive layer 2 (for example, Cu matting), an electrically insulating, for example, likewise textile-like layer 3 (for example, mesh or sponge rubber), another electrically conductive layer as a shielding electrode 4 and another electrically insulating layer 3, which is mountable on a machine (not shown here), for example by bonding. Also recognizable are electrical field lines 5, which form between potential surfaces 6 and 7 of layer 2.

Figure 1B:
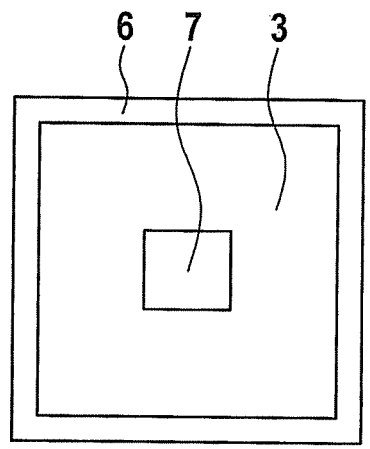

FIG. 1B shows a top view of surfaces 6 and 7 and insulating layer 3 in a square assembly. Here potential surface 6 represents a signal electrode and potential surface 7 the measuring electrode.

Figure 2:
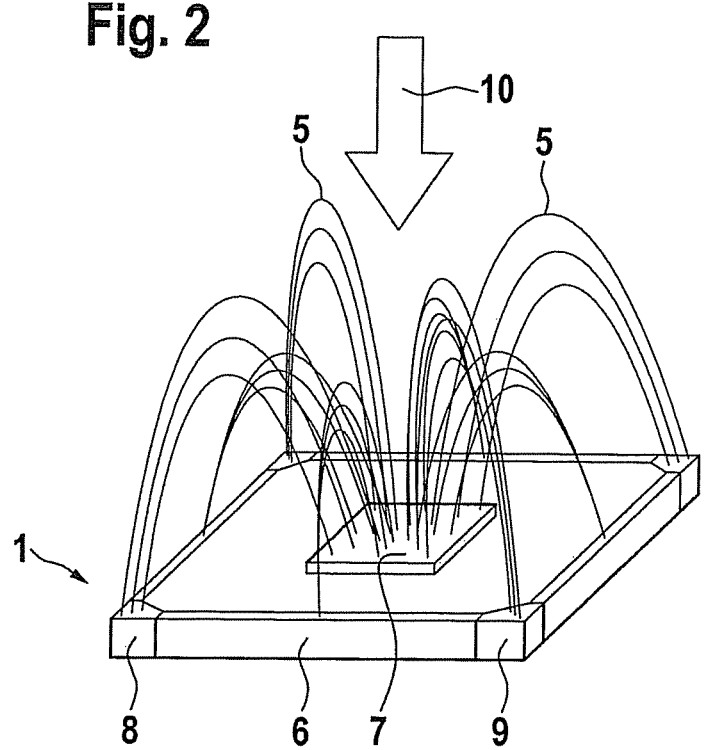
FIG. 2 shows a top view of a sensor element according to FIG. 1, with field lines and connecting elements for joining together a plurality of sensor elements.

FIG. 2 shows sensor element 1 from FIGS. 1A, B in a different view, sockets 8 and plugs 9 for coupling additional sensor elements 1 also being indicated schematically. The capacitance between potential surfaces 6 and 7 is changed here, for example, by an approaching human body part (for example, a hand of the operator of the machine, indicated by arrow 10) in the electrical field and detectable thereby, and may result in a signaling or direct response, for example, a stopped motion.

Sockets 8 and plugs 9 may be placed at various corners of sensor element 1 for interconnecting in any way desired. A system in which a circuit board 11 is connected to parts of an electronic evaluation unit with a socket 8 and a plug 9 at the lower right is shown in FIG. 3A; FIG. 3B shows an arrangement having a plug 9 at the upper right and FIG. 3B shows an arrangement having a plug 9 at the upper left. The circuits on boards 11 of all sensor elements 1 are thereby connectable to an evaluation electronics unit through electric lines for transferring power and data.

In order to keep the cost of wiring low, sensor elements 1 may thus be wired by connecting them one after the other (for example, in a daisy-chain topology). Each sensor element 1 therefore has a socket 8 and a connecting cable provided with a plug 9, using which the connection to the next sensor element 1 may be made. The connecting cables to the next sensor element 1 may be inserted in various grooves of sensor element 1, as needed.

Integrated into each sensor element 1 is therefore an electronic circuit, which is preferably built on a flexible substrate as circuit board 11. This electronic circuit converts the measured capacitance to electric signals and transmits the latter to the evaluation unit, which will be described later. In addition, it is also possible to integrate circuit parts that allow a cyclical self-diagnosis to check all of the safety-relevant functions of sensor elements 1.

FIG. 4 shows another exemplary embodiment of a sensor element 12, having an additional function besides the previously explained approach sensor system, in the form of collision sensing through contact. To this end, additional electrodes are incorporated into layer 13. The variable measured here is the capacitance between the electrodes in layer 13, so that when there is a collision of sensor element 12 with an object, the elastic insulating layer 5 between the electrodes of layer 13 and an additional electrode 14 is compressed, and the capacitance between the electrodes of layer 13 is reduced as a result. This change is detected, and may be reported to a signal output as a collision.

Sensor elements 1 and 12 are thus soft, flexible measuring elements, preferably for detecting the approach of human and machine and/or the contact forces in collisions, the two basic functions being implementable individually or jointly. Such sensor elements 1 and 12 may be executed using a few basic geometric shapes (squares, rectangles, triangles), which may be tied together in order to cover surfaces of almost any shape without gaps. A plurality of sensor elements 1 and 12 tied together form a sensor skin, described further on in greater detail, which may be pulled like a jacket over a machine part requiring securing. A sensor skin segment may also include a plurality of sensor skin segments which are movable relative to each other. For example, the securing of a six-axis robot may require that the sensor skin be divided into six mechanically separate segments, each of which completely covers one axis. The individual sensor skin segments do not in themselves become distorted as the machine moves, but may shift or twist relative to each other.

Specific embodiments of sensor elements 1 or 12 may be inferred from FIGS. 5A, 5B and 5C, which show examples for cutting lines 15 for conforming the shape of the particular sensor element 1 or 12 to a machine surface. That makes it possible, by combining a plurality of sensor elements 1 or 12, to provide a so-called sensor skin that may cover any three-dimensional surface structure. To cover such a larger surface, a plurality of sensor elements 1 or 12 may be placed progressively on the surface, arranged, for example, in the form of a chain, and at tight places, at the edge or on curved surfaces, the necessary sensor elements 1 or 12 are arranged to fit. Concrete design options for the sensor skin will be described later on the basis of FIGS. 6 and 7.

Next, sensor elements 1 or 12 are attached to each other, for example, by an adhesive cover over the entire surface using a textile adhesive tape. After that the entire composite may be removed from the surface and all sensor elements 1 or 12 may be connected electrically via their sockets 8 and plugs 9 to form a chain. Extension cables may also be employed to bridge greater distances.

The above-described composite now forms the so-called sensor skin. The latter is placed on the machine surface and is fixed in place using adhesive tape, or by covering it with a custom-tailored hood of synthetic leather. This composite is easily installable and uninstallable, for example, for purposes of servicing and maintenance. Finally, this sensor skin is connected to an evaluation unit, described further below.

FIG. 6 shows exemplary embodiments of sensor elements 1 or 12 in various geometric shapes, such as square, rectangle, or triangle, openings 31 also being visible here which are suitable for passing through hook-and-loop (Velcro) straps, for example, to chain the sensor elements 1 or 12 together. FIG. 7 shows as an example of such an arrangement a sensor skin having sensor elements 1 or 12 chained together with the aid of hook-and-loop straps 32. A plurality of sensor elements 1 or 12 are thereby joined to each other mechanically to make the sensor skin using detachable connections, for example, also according to a cord and hole principle (cords which are pulled like shoelaces through holes at the edges of the sensor elements), with hook-and-loop straps, with snap fasteners or with adhesive tape. All the sensor elements 1 or 12 of a sensor skin are wired in series with cables, and are connected through the first sensor element 1 or 12 to a central unit, described further below.

As an additional exemplary embodiment, refining FIG. 4, a layered design of a passive sensor element 12 for approach detection and collision detection will be explained on the basis of FIG. 8, having flexible, textile-like layers, of which some are conductive and others insulating. The shown 30 layers, described below, may be joined here into a multilayer packet approximately 9 mm thick by fastening them together over the entire area.

The topmost layer is an elastic insulation layer 41 for electrical passivation on the operator side, as shielding against environmental influences and as an optical termination.

Next follows a conductive layer 42 as structured copper matting, in which, according to FIG. 8A, a potential surface A as transmitting surface and a potential surface B as receiving surface for the measuring capacitance of sensor element 1 are used as approach sensors.

Beneath that is an insulation layer 43, which prevents electrical contact between layer 42 and subsequent layer 44.

Layer 44 represents a full-area potential surface for measuring the capacitance to the adjacent sensor elements, not shown here, and is used in particular to limit the near field sensor operating direction to the operator side, to block the electrical fields in the machine-side direction, to block machine interference in the near field sensor, to block operator interference in the contact force sensor, and to limit the electric fields of the contact force sensor to a layer 47, which is explained further below.

There then follows again an insulation layer 45, which prevents electrical contact between layer 44 and a layer 46.

Conductive layer 46 is again a structured copper mat in accordance with FIG. 8B, in which potential surfaces 4 are designed as a contact force sensor, as identical measuring capacitances D/E1, D/E2, D/E3 and D/E4 for the measuring capacitances of sensor element 12. The four identical measuring capacitances D/E1, D/E2, D/E3, D/E4 here each cover one fourth of the area of sensor element 12.

Below that is a layer 47, for example, of foam rubber having a thickness of approximately 1.7 mm, as a force/distance converter: The contact forces compress the foam rubber and in consequence the distance between layer 46 and a layer 48 decreases, and as a result the capacitance between the electrodes of layer 46 changes. In addition, the foam rubber of layer 47 is used as a mechanical buffer to increase passive safety.

Conductive layer 48 is again a structured copper mat, and is at ground potential. Structuring F according to FIG. 8C is used exclusively to improve the mechanical elasticity and compressibility when sensor element 1 is bent, and to restrict the electric fields of sensor element 1 as a contract force sensor to layer 47.

There follows again as layer 49 foam rubber (for example, having a thickness of approximately 5 mm) as a mechanical buffer to increase passive safety, to receive, for example, two circuit boards (not shown here) in cavities in the foam rubber; one circuit board may be designed for the approach sensor and one circuit board for the contact force sensor. Each sensor element 1 may therefore include, on the circuit boards, a microcontroller for the approach sensor system and, separate from that, a microcontroller for the contact force sensor system. Layer 49 is also used for electrical passivation on the machine side.

The controllers of sensor elements 1 are thus also integrated compactly into the flexible substrate, while appropriate circuit parts convert the capacitances being measured into electrical signals and transmit these to the central electronics. In addition, circuit parts may be present that permit cyclical self-diagnosis of all safety-relevant functions of sensor element 1.

All controllers are connected to the central electronics through electric lines for transmitting power and data, as explained further below. In order to keep the cost of wiring low and to enable unambiguous addressing of sensor elements 1, the latter are preferably wired by connecting them in series, for example, in a daisy-chain topology, the address of a sensor element 1 resulting, for example, from its position in the chain.

Figure 9A:
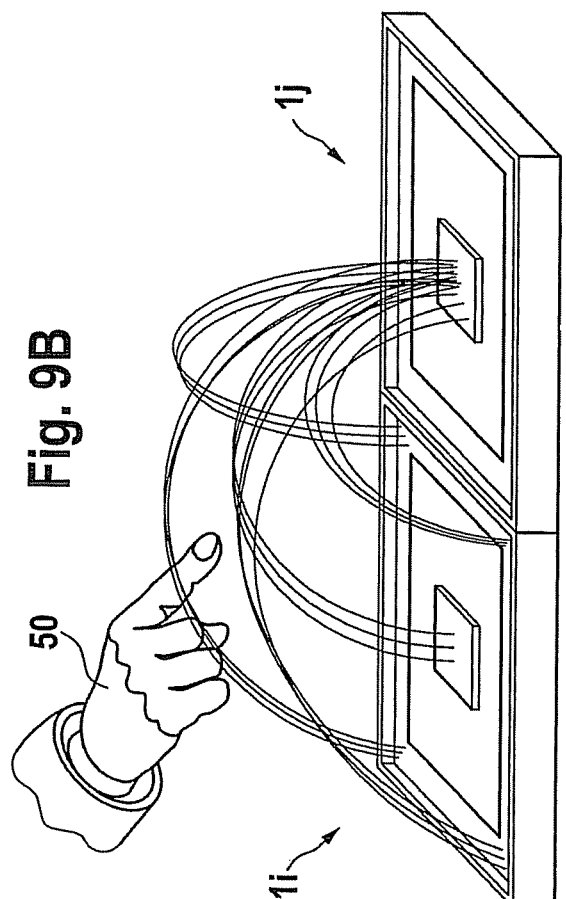
FIGS. 9A and 9B show a schematic representation of an approach to sensor elements.
Figure 9B:
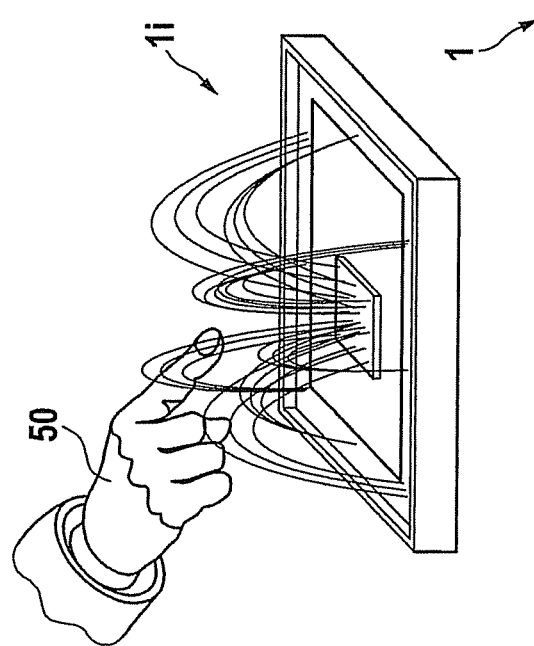

FIGS. 9A and 9B will now be used to explain how a sensor element $1i$ detects an approach of a human body part 50 or of other objects on the basis of the change in capacitance of a capacitor having an open field space.

The two potential surfaces A and B (see FIG. 8A) in layer 42 of sensor element $1i$ are available as a measuring capacitance; they form a measuring capacitance $C_{ii}$, potential surface C (see layer 44 from FIG. 8B) being at ground potential. The two potential surfaces of measuring capacitance $C_{ii}$ may also be distributed over two adjacent sensor elements $1i$ and $1j$ according to FIG. 9B, in which case there are benefits from the fact that a larger detection range is possible and a detection is also performable at gaps between sensor elements $1i$ and $1j$. The potential surface in left sensor element $1i$ then uses potential surface A (layer 42) or C (layer 44) or both connected together electrically; the corresponding potential surface in right sensor element $1j$ is surface B (layer 42), and a measuring capacitance $C_{ij}$ is formed.

When the sensor system having sensor elements $1i$ and $1j$ is initialized, it is determined which of the measuring capacitances $C_{ij}$ are to be monitored. The measuring capacitances $C_{ij}$ being monitored are measured and are saved once as starting values $C_{ij}0$. During operation, the measuring capacitances $C_{ij}$ being monitored are measured cyclically in a constant time grid, typically 100 Hz-1000 Hz. The information about an approach may be derived from an evaluation of these data.

Two example preferred methods are described below, which complement each other and therefore may both be employed simultaneously. An approach is reported when at least one of the methods detects an approach.

a) Static Approach Detection

An approach is detected if the following is true for at least one measuring capacitance $C_{ij}$:

$$|(C_{ij}-C_{ij}0)/C_{ij}0| > T\text{stat};$$

$C_{ij}$: present measured capacitance value
$C_{ij}0$: measured value stored at initialization;
Tstat: applicable threshold value; unit: %

In other words, if at least one capacitance measurement Cij deviates from its initialization value by more than Tstat, an approach is detected, a typical value range for Tstat being 10%-50%.

b) Dynamic Approach Detection

An approach is detected if the following is true for at least one measuring capacitance Cij:

$$d(Cij/Cij0)/dt > Tdyn;$$

dt: observation period

Tdyn: applicable threshold value; unit: %/s.

In other words, if at least one capacitance measurement Cij shows a change of more than (Tdyn*dt) in any time period dt, an approach is detected, a typical range for dt being 0.1 s-1 s and for Tdyn 10%/s-100%/s. The values for Tdyn and Tstat are defined in the system calibration.

Typically, uniform data may be used for all sensor elements 1 or 1$i$, 1$j$ of a modularly formed sensor skin; in special cases an individual determination of the limit values may also be provided for individual sensor elements 1; 1$i$, 1$j$.

Since the change in capacitance increases disproportionately as an approach occurs, the dynamic approach detection brings about a large switching distance at high speeds and a small switching distance at low speeds. This fits well with the physical law that greater braking distances are needed at high speeds. Collision-free operation is therefore benefited by the dynamic function.

At the same time, false triggering at low speeds is prevented, since a slow change in capacitance does not result in exceeding the threshold value Tdyn. So a machine part running slowly as intended, for example, in the vicinity of the sensor skin does not result in false triggering.

The static approach detection prevents bruising of body parts even at low speeds, since if the spacing becomes smaller than the minimum defined by Tstat, reliable machine stoppage always occurs.

The operating principle when a collision is detected results as follows.

The measuring capacitance of sensor element 1 as a contact force sensor is formed from structures D and E according to FIGS. 8, 8A, 8B, 8C. The division of structure E into a plurality of identical individual structures (E1-E4) shown in FIG. 8B, and the sequential measurement of the capacitances (CDE1, CDE2, CDE3, CDE4), increases the sensitivity and enables more precise localization of the point of force application on sensor element 1, but is not absolutely necessary.

The field space of the measuring capacitances is shielded outwardly toward both sides by potential surfaces C (layer 44) and F (layer 48), which are connected to ground potential, so that interference from external fields is blocked.

A mechanical contact with the sensor skin from sensor elements 1 results primarily in denting the soft foam rubber thicknesses into layers 47 and 49. That causes ground surface F to move closer to measuring capacitance D/E and reduces the latter, so that the information about the mechanical contact may be represented from the measured values. Various methods may be used to accomplish this. A preferred, very simple example method reports a contact when the relationship of the measuring capacitances is as follows:

$$CDEi > CT \text{ for all } i=1 \ldots n$$

(n: number of measuring cells on the sensor element)

The applicable threshold value CT is set here so that safe operation is achieved.

The electrical function of a sensor system having sensor elements 1 is explained below.

Figure 10:
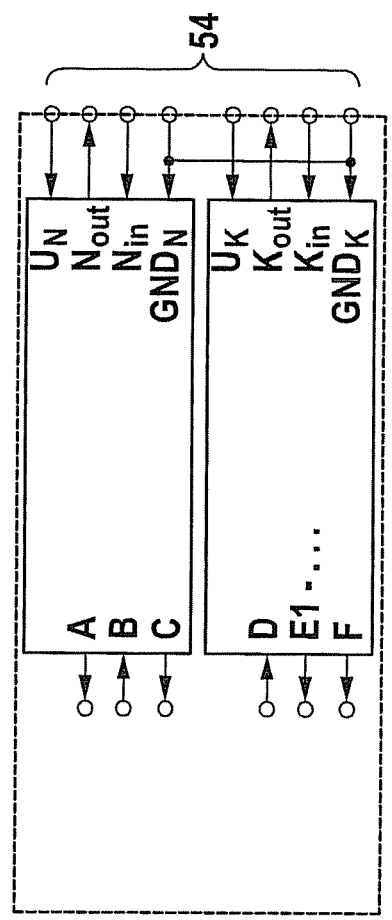
FIG. 10 shows a schematic block diagram of circuit elements of an approach and contact force sensor system in the sensor element.

FIG. 10 shows a block diagram of a sensor element 1, in which an approach sensor system 52 having potential surfaces A, B, C and a contact sensor system 53 having potential surfaces C, D, E, F work independently of each other; that is a malfunction such as failure, short circuiting or interruption of certain components of the one system does not result in failure of the other system. The only electrical connection of the two systems exists via the ground line GNDN/GNDK.

Supply and signal lines are shown on the right side, UN, GNDN representing the operating voltage using modulated information transmission from a central unit to sensor element 1; Nin, Nout representing the digital signal lines for information transmission from sensor elements 1 to the central electronics. Supply and signal lines 54 for contact force sensor system 53 are constructed similarly, with Kin, Kout having the same function for contact force sensor system 53 as Nin, Nout have for approach sensor system 52.

Thus each sensor element 1 contains a controller for approach sensor system 52 and a controller for contact force sensor system 53. The only electrical connection between the two is through their ground lines GNDN and GNDK. The connecting lines of the two controllers are brought out on separate plugs, to prevent simultaneous failure of both systems in the event of cable degradation.

Figure 11:
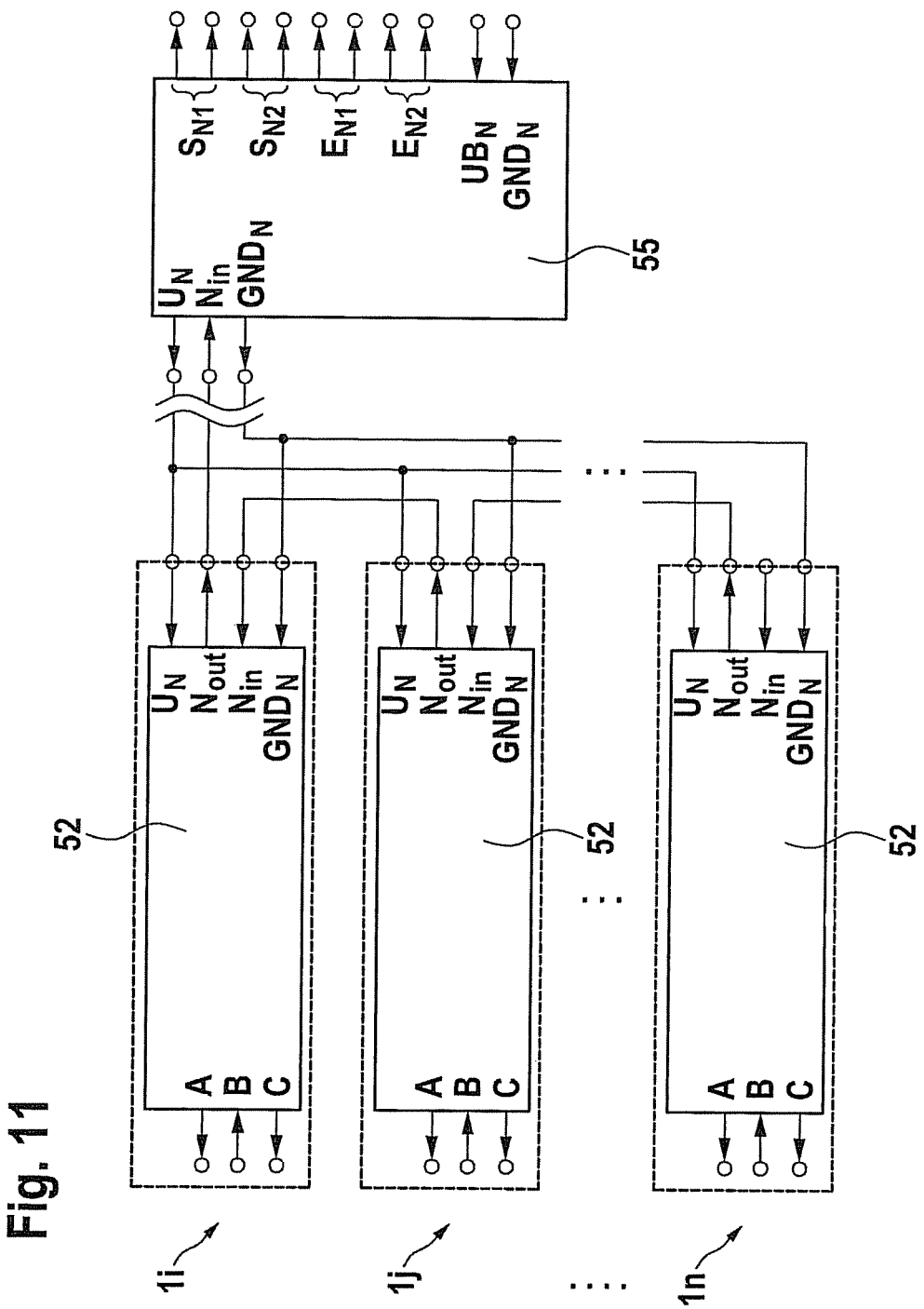
FIG. 11 schematically shows a block diagram of a plurality of sensor elements, each having an approach sensor system and central electronics.

The block diagram according to FIG. 11 shows sensor elements 12, numbered continuously from 1 to n and 1$i$,1$j$ to 1n, which are intended to form a sensor skin having an approach sensor system 52. A separate central electronics unit 55 is also present, and the electrical connection of supply and signal lines 54 between sensor elements 1$i$, 1$j$ through 1n and central electronics unit 55 are shown. Central electronics unit 55 has the master function here, and sensor elements 1$i$, 1$j$ through in have the slave function. Central electronics unit 55 obtains the operating voltage via terminals UBN and GNDN and makes four potential-free switching outputs available, namely SN1, SN2 as doubly redundant switching outputs for signaling "Approach detected" and EN1, EN2 as doubly redundant switching outputs for signaling "System error detected."

Sensor elements 1$i$, 1$j$ through in are connected to each other and to central electronics unit 55 via a three-wire cable. Central electronics unit 55 provides the supply voltage for the approach-detection controllers of all sensor elements 1$i$, 1$j$ through 1n at terminals GNDN and UN. A signal transmission to sensor elements 1$i$, 1$j$ through 1n is modulated on the supply voltage. Central electronics unit 55 uses this signal transmission to send commands to all controllers in sensor elements 1$i$, 1$j$ through 1n for the purpose of changing internal parameters or querying values. Individual sensor elements 1$i$, 1$j$ through 1n may be addressed selectively via specified addresses, it being possible to find the particular address of a sensor element 1$i$, 1$j$ through 1n, for example, from its position in the chain.

The flow of information from a sensor element 1$i$, 1$j$ through 1n to central unit 55, for example, regarding measurements, status information or error information, may take place according to the bucket brigade principle, i.e., by forwarding it through sensor elements 1n-1 through 1, for which communication terminals Nin and Nout are provided.

Figure 12:
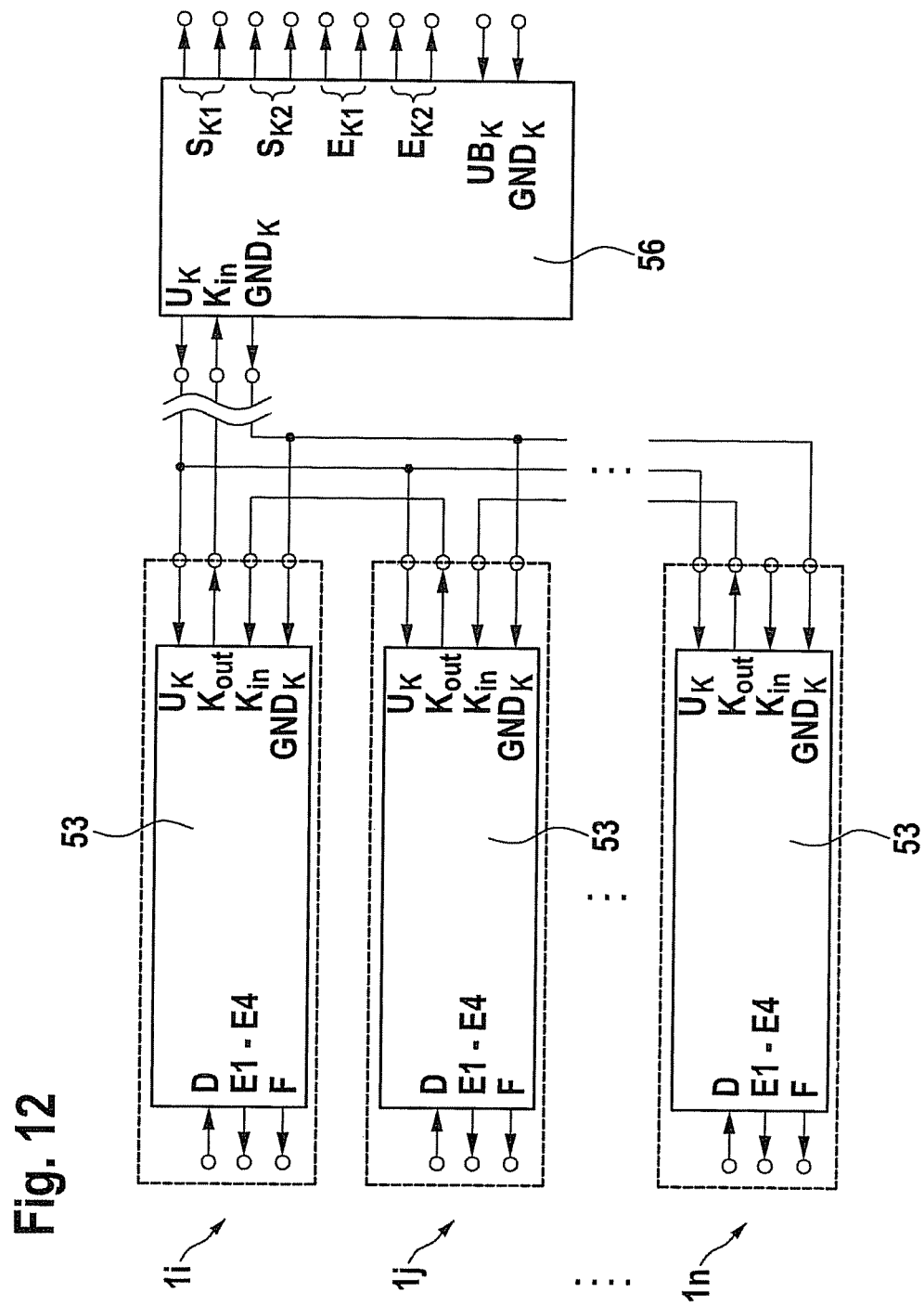
FIG. 12 schematically shows a block diagram of a plurality of sensor elements, each having a contact force sensor system and central electronics.

FIG. 12 shows a system for evaluating contact force sensor system 53 in a central electronics unit 56, comparable to the system according to FIG. 11. The functions correspond to the approach detection according to FIG. 13, with changed designations (SK1, SK2 instead of SN1, SN2; EK1, EK2 instead of EN1, EN2; UBK instead of UBN; GNDK instead of GNDN; Kin, Kout instead of Nin, Nout).

In the systems of FIGS. 11 and 12, in a slower cycle (for example, 1 Hz) superimposed on the test cycle the particular central electronics unit 55 or 56 for each sensor element 1i, 1j through in may perform a self-diagnosis. In so doing, test voltages are applied to sensor elements 1i, 1j through 1n and their response is measured by the respective central electronics unit 55 or 56. The test strategy may be chosen so that malfunctions of the respective sensor element 1i, 1j through in are clearly recognized as errors. As soon as at least one sensor element 1i, 1j through 1n is recognized as defective, central electronics unit 55 or 56 reports the error at output EN1/EN2 (approach detection) or KN1/KN2 (contact force detection).

Alternatives or extensions to the exemplary embodiments described above are also possible.

A sensor element 1i, 1j through 1n employed exclusively for approach detection, without contact force detection, may be made up only of layers 41 (optional), 42, 43, 44 and 49 (see FIG. 10) each having the associated controller.

A sensor element 1i, 1j through in employed exclusively for contact force detection, without approach detection, is possibly made up only of layers 41 (optional) and 44-49 having the associated controller.

Optionally, additional independent safety systems may be installed.

The transfer of information between central electronics units 55, 56 and sensor elements 1i, 1j through in may take place on the basis of other conventional and appropriate technologies, regarding the physical level (for example, by wireless transmission, analog/digital, serial/parallel), the data protocol, the network topology (e.g., ring, star or tree topology) and the methods for detecting or correcting transmission errors.

For a large sensor skin, a plurality of the described systems may be employed in a cascaded form, by having a higher-level controller assume the coordination of a plurality of central electronics units 55, 56.

For calibration or system diagnosis, additional interfaces, display or operating elements may be tied into the sensor system, using which the internal states may be read out or changed.

Using additional functional layers, the scope of functions of the sensor skin may be expanded. For example, the outside of sensor elements 1i, 1j through in may be covered with a non-conductive textile (synthetic leather, for example), which protects the sensor elements from dust, soil, and moisture.

To further simplify the installation, electric power may be supplied to sensor elements 1i, 1j through 1n through non-contact power transmission. For example, a continuous exciter line carrying alternating current may be run beneath all the sensor elements, so that a receiving coil in each sensor element acquires the supply power from the alternating magnetic field.

Structures may be incorporated into sensor element 1i, 1j through 1n which cause a cooling of the covered machine parts (for example, holes, ventilation ducts, or refrigerating coils).

The adjacent sensor elements 1i, 1j through 1n may be mechanically linked using conventional and appropriate technologies, for example in a solid grid (cord and eyelet principle, latching tongues, clips, snap fasteners) or without a grid (adhesive tape, bonding).

Additional conventional and appropriate materials may be utilized as a conductive, elastic layer, for example, conductive polymers, conductively coated films or fabrics, nets or meshes of conductive fibers.

To further increase the elasticity, the layers may be slotted or folded in various ways.

What is claimed is:

1. A sensor system for monitoring surroundings on a mechanical component, comprising:
at least one capacitive sensor element that is attachable on a surface of a machine or a machine part, the at least one sensor element including a layered structure of flexible, electrically conductive and electrically insulating layers, wherein the layers are adaptable to be cut to conform to various surfaces; and
electrically conductive potential surfaces of one layer being positioned with lateral spacing above insulating layers lying between them in such a way that electrical field lines form between the conductive potential surfaces which change measurably upon at least one of approach to and contact with, a body or object.

2. The sensor system as recited in claim 1, wherein the electrically conductive potential surfaces include a central conductive potential surface of one polarity, and at an edge of the sensor element, a second one of the electrically conductive potential surface of a different polarity, which surrounds the central conductive potential surface via an insulating layer, is on one of the sensor element or an adjacent sensor element.

3. The sensor system as recited in claim 1, wherein the layered structure includes an upper layer of the conductive potential surfaces, a first of the insulation layers insulating layers beneath the upper layer, a second of the conductive potential surfaces lying beneath the insulating layer as a shielding electrode, and a subsequent insulating layer lying beneath the second of the conductive surfaces which provides insulation toward the machine or machine part.

4. The sensor system as recited in claim 1, wherein the layered structure includes sensor elements in an upper layer of the conductive potential surfaces, a first of the insulating layers lying beneath the upper layer, another of the conductive surfaces lying beneath as a shielding electrode, a second of the insulating layers lying beneath the other of the conductor potential surfaces, a third of the conductive potential layers lying beneath the second of the insulating layers as a second electrode, and a subsequent layer lying beneath that which provides insulation toward the machine or machine part, a capacitance between the shielding electrode and the second electrode being measurably changeable by tactile pressure from outside.

5. The sensor system as recited in claim 1, wherein the at least one sensor element includes a plurality of sensor elements which are connected to each other via lateral contacts.

6. The sensor system as recited in claim 1, wherein the at least one sensor element includes a plurality of sensor elements which are connectable to each other via connections.

7. The sensor system as recited in claim 6, wherein the connections are at least one of plugs and sockets.

8. The sensor system as recited in claim 1, wherein flexible electrical circuit boards are attached on a side of the machine to at least one of the at least one sensor element to receive electronic measuring circuit parts, which are one of contactable, or connectable to each other and are switchable to a central electronic evaluation unit.

9. The sensor system as recited in claim 1, wherein the electrically conductive layers or the conductive potential surfaces are each made of a flexible, conductive mat, the electrically insulating layers are made of a textile-like mesh, and the layers are adapted to be cut to size and adapted and attached to complex three-dimensional shapes.

10. The sensor system as recited claim 9, wherein the conductive mat is copper matting and the textile-like mesh is one of felt, plastic or plastic foam.

11. The sensor system as recited in claim 9, wherein the layers are adapted to be cut to size and glued to each other.

12. The sensor system as recited in claim 1, wherein the sensor element is for exclusive contact force measurement and has an elastic layer which is compressible in such a way that a change in spacing results in a change in capacitance.

13. The sensor system as recited in claim 1, wherein each of the sensor elements has at least one of an approach sensor system and a contact force sensor system, as slave systems, whose measured values are processable one of parallel to or independently of each other in one of shared or separate central electronics units as a master system.

14. A method for activating and evaluating a sensor system, the method comprising:
cyclically addressing, by an electronic evaluation unit, all sensor elements of the sensor system, wherein the sensor system includes at least one capacitive sensor element that is attachable on a surface of a machine or a machine part, the at least one sensor element including a layered structure of flexible, electrically conductive and electrically insulating layers, and wherein the layers are adaptable to be cut to conform to various surfaces, and electrically conductive potential surfaces of one layer being positioned with lateral spacing above insulating layers lying between them so that electrical field lines form between the conductive potential surfaces which change measurably upon at least one of approach to and contact with, a body or object; and
checking whether a significant change in capacitance has occurred in at least one of the at least one sensor element in comparison to a reference value, so that one of an approach or a collision in the surroundings of one of the machine or of the machine part is signaled at one output.

15. The method as recited in claim 14, wherein to address linearly chained sensor elements, a sequential order of the sensor elements is used by forwarding data along the chain through a plurality of the sensor elements to the evaluation unit.

16. The method as recited in claim 14, wherein in another, slower cycle each of the sensor elements is subjected to a self-diagnosis, one of test voltages or a characteristic signal pattern being applied to the sensor elements.

17. The method as recited in claim 16, wherein a static and dynamic approach detection is carried out by performing a detection of an approach by cyclic measurement of the capacitance between two electrically conductive potential surfaces and comparing the measured value with one or more reference values, at least one of overshooting and undershooting one or more reference values by predefined thresholds being evaluated as an approach, a reference value being one of stored as a constant value in the system, measured when the system is initialized, or ascertained from a measured capacitance curve as a time-filtered value.

18. A method for activating and evaluating a sensor system, the method comprising:
cyclically addressing, by an electronic evaluation unit, all sensor elements of the sensor system, wherein the sensor system includes at least one capacitive sensor element that is attachable on a surface of a machine or a machine part, the at least one sensor element including a layered structure of flexible, electrically conductive and electrically insulating layers, and wherein the layers are adaptable to be cut to conform to various surfaces, and electrically conductive potential surfaces of one layer being positioned with lateral spacing above insulating layers lying between them so that electrical field lines form between the conductive potential surfaces which change measurably upon at least one of approach to and contact with, a body or object; and
checking whether a significant change in capacitance has occurred in at least one of the at least one sensor element in comparison to a reference value, so that one of an approach or a collision in the surroundings of the machine or of the machine part is signaled at one output;
wherein the at least one sensor system is employed with an automatic machine located in a shared working space together with operators or service personnel, and at least one of an approach to or collision with the machine or a part of the automatic machine is registered and used to emit a warning or stop signal.

19. The sensor system of claim 1, wherein sensor elements are cuttable to conform the shape of the sensor element to a machine surface.

* * * * *